United States Patent [19]

Grint

[11] 4,247,141
[45] Jan. 27, 1981

[54] SPADES

[76] Inventor: Charles I. Grint, 265E Eliot Height, New Plymouth, New Zealand

[21] Appl. No.: 63,265

[22] Filed: Aug. 2, 1979

[30] Foreign Application Priority Data

Aug. 4, 1978 [NZ] New Zealand .................... 188070

[51] Int. Cl.³ .............................................. A01B 1/02
[52] U.S. Cl. ................................................. 294/49
[58] Field of Search ............... 294/49, 55, 55.5, 57, 294/51; 76/113; 15/143 R; 30/340; 209/419; 7/116

[56] References Cited

U.S. PATENT DOCUMENTS

| | | | |
|---|---|---|---|
| 1,085,642 | 2/1914 | Surbaugh | 294/49 |
| 1,583,916 | 5/1926 | Demars | 294/49 |
| 3,767,249 | 10/1973 | Rogers | 294/49 |
| 3,848,915 | 11/1974 | Wherry | 294/49 |

Primary Examiner—James B. Marbert
Attorney, Agent, or Firm—Holman & Stern

[57] ABSTRACT

This invention relates to a spade for use in planting seedlings of forest plants, comprising a handle, a shaft, and a blade, the blade being four-sided and substantially planar, having a base edge, two side edges and a tread edge. The base edge and a substantial portion of the two side edges which taper towards the base edge are sharpened. The blade is reinforced by having two raised ribs which are formed by pressing out two raised portions of the blade. These ribs extend along the length of the blade for greater than half the length thereof. An additional rib extends between the two ribs from the point of attachment of the shaft at the thread edge for a distance greater than half the length of the blade and tapering toward the base edge.

3 Claims, 1 Drawing Figure

SPADES

Summary of the Invention

This invention relates to spades.

More particularly this invention relates to a spade for use in planting out seedlings of forest plants such as pinus radiata.

In accordance with the invention there is provided a spade comprising a handle, a shaft and a blade, the said blade being four sided and substantially planar and being characterised in that the base edge of the blade together with at least a substantial portion of the two vertically disposed edges are sharpened.

Further preferred features of the invention include tapering the blade towards the base, strengthening the blade, and adding extra weight to the spade.

By incorporation of the preferred features of the invention, it is possible for the spade to be forced into normal soil in which seedlings are to be planted by hand pressure alone.

Brief Description of the Drawing

The invention is illustrated by the accompanying drawing which shows in plan view one form of spade of the invention.

Detailed Description

Figure 1:
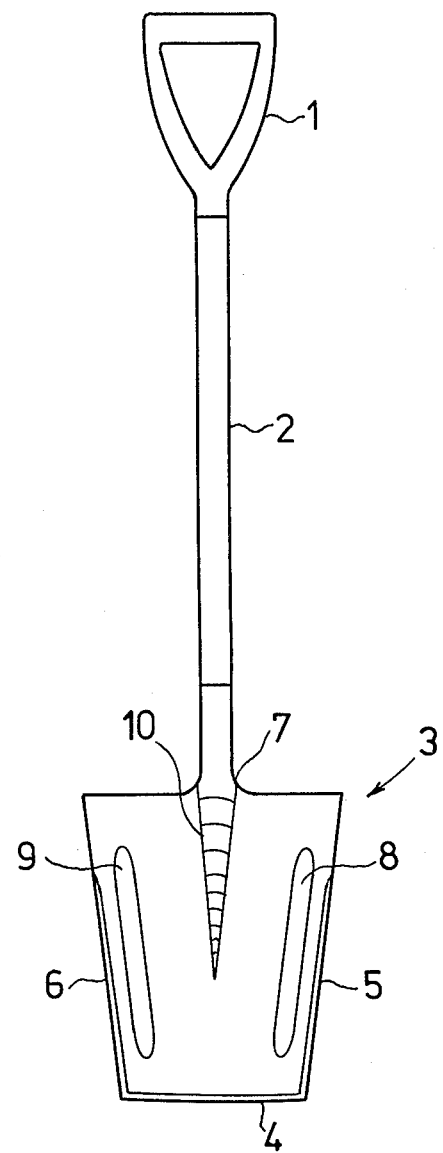

The spade of this invention comprises a handle 1 which can be of any normal shape and constructed of any suitable material, such as of a moulded plastics, of sufficient strength to perform its desired function.

The handle 1 can be joined in rigid manner to the shaft 2 (such as by rivetting) which in the preferred form of the invention is of heavy metal such as steel both for strength and weight.

The shaft is rigidly connected to the blade (indicated by arrow 3), which also of strong metal construction, by suitable solid metal to metal connections such as by welding. The blade can be cast or moulded or otherwise formed in the desired shape.

As in a normal spade the blade is a four sided article having a base edge 4, two vertically disposed edges 5 and 6 and a tread edge 7. In accordance with the invention the base edge 4 and at least a substantial portion of the vertically disposed edges 5 and 6 are each sharpened. By the term "sharpened" is meant that the edges are honed down below the normal thickness of the material of the blade.

By the term a "substantial proportion" of the vertically disposed edges is meant that the edges are sharpened to an extent that a significant increase in the ease by which the spade can be forced into the ground is achieved. Preferably the vertically disposed edges are sharpened for greater than half their length, more preferably greater than two thirds their length and in some circumstances it may be feasible to sharpen the whole side thereof.

For further increasing the ease by which the spade can penetrade soil, the vertically disposed edges 5 and 6 preferably taper towards the base.

The tread edge 7 can be provided with a rearwardly extending flange (not shown) for boot pressure to be applied when an obstruction is encountered by the spade in use.

The blade is also preferably strengthened longitudinally by for example pressing out portions of the blade forming ribs 8 and 9 on the upper surface and thereby consequential indentations on the reverse surface, and also having a raised extension of the shaft 10 centrally longitudinally disposed again with a consequential recess on the reverse side.

In use a spade for use in creating a hole for planting forestry seedlings needs to be operable quickly and provide a recess in the ground which can rapidly receive the seedling. The ground needs to be rapidly compactable about the seedling. The hole made needs to provide the necessary situation for growth of the seedling.

In planting seedlings with the spade of the invention, two cuts need to be made in the soil substantially perpendicular to each other in the form of a cross. The spade is inserted in the soil right up to the tread edge of the blade, the blade is then withdrawn causing a slight raising of the soil in the area beyond the base of the cut. The perpendicularly disposed insertion is then made and the spade again withdrawn, again raising the soil to a small extent which then leaves a centrally disposed albeit narrow hole at the junction of the two cuts in which a seedling can be quickly inserted. Foot pressure on the soil surface returns the displaced soil back to its original condition compacted about the seedling.

The width of the base of the spade is important in order to be of sufficient size to accommodate the normal root system of a seedling.

Thus the base is preferably about 12.5 centimeters but obviously can be increased in size beyond this valve but this necessarily increases the effort needed to insert the spade into the soil. Overall dimensions of the spade can for example be a base edge of 12.5 centimeters, the two vertical edges of about 29.5 centimeters and a tread width of about 20 centimeters. Ribs 8 and 9 can be about 17 centimeters long, indented to a height of about half a centimeter. The strengthening extension of the shaft can extend about 17½ centimeters from the tread edge of the blade.

The blade can also be bowed in either or both a vertical and a transverse direction.

In addition, the axis of the shaft and the plane of the blade can be linearly aligned, or parallel by providing a curved portion of the shaft where it meets the blade such that the blade is offset rearwardly from the main portion of the shaft to assist in sighting of the desired area of soil. Alternatively the blade can be offset rearwardly at the tread edge and be aligned at an angle to the shaft so that the base edge is substantially in line with the longitudinal axis of the shaft.

The weight of the spade is preferably increased beyond the normal weight of the spade such as by providing the shaft of solid metal construction or else by having a hollow shaft and inserting a heavy steel or other heavy metal rod through the center thereof and rigidly connecting the rod to the shaft.

While the invention has been described with reference to preferred embodiments the invention it is not to be construed as being limited thereto and where known equivalents exist for specific integers herein mentioned, such known equivalents are to be construed as incorporated herein as if specifically set forth.

We claim:

1. A spade for use in planting out seedlings of forest plants comprising a handle, a shaft and a blade, the said blade being four sided, having a base edge, two side edges, a tread edge and being substantially planar, the base edge together with at least half of the length of each of the side edges being sharpened, the two side edges tapering towards the base edge, and the side blade being strengthened by pressing out two raised portions of the blade to form raised ribs, each of the raised ribs extending in elongate fashion with an axis aligned substantially longitudinally of the blade, and extending for greater than half the length of the blade.

2. A spade as claimed in claim 1 wherein said blade is further strengthened by a raised shaft rib extending from the tread edge of the blade to which said shaft is attached between said two ribs for a distance greater than half the length of the blade and tapering towards said base edge.

3. A spade as claimed in claim s 1 or 2, wherein said shaft of the spade is hollow and contains a heavy metal rod therein.

* * * * *